(12) United States Patent
Song et al.

(10) Patent No.: US 11,428,194 B2
(45) Date of Patent: Aug. 30, 2022

(54) GAS ENGINE POWER GENERATION SYSTEM

(71) Applicant: LG ELECTRONICS INC., Seoul (KR)

(72) Inventors: Jingeun Song, Seoul (KR); Song Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/028,091

(22) Filed: Sep. 22, 2020

(65) Prior Publication Data

US 2021/0095621 A1    Apr. 1, 2021

(30) Foreign Application Priority Data

Sep. 27, 2019 (KR) .......................... 10-2019-0120064

(51) Int. Cl.
*F02M 31/04* (2006.01)
*H02K 7/18* (2006.01)

(52) U.S. Cl.
CPC ........... *F02M 31/04* (2013.01); *H02K 7/1815* (2013.01)

(58) Field of Classification Search
CPC .............................. F02M 31/04; H02K 7/1815
See application file for complete search history.

(56) References Cited

U.S. PATENT DOCUMENTS

| 6,848,419 | B1 | 2/2005 | Donaldson | |
|---|---|---|---|---|
| 2007/0197157 | A1* | 8/2007 | Bellinger | F02B 29/0418 454/155 |

(Continued)

FOREIGN PATENT DOCUMENTS

| EP | 0911503 | 4/1999 |
|---|---|---|
| EP | 3343754 | 7/2018 |

(Continued)

OTHER PUBLICATIONS

European Search Report dated Jan. 26, 2021 issued in Application No. 20198075.2.

*Primary Examiner* — Sean Gugger
(74) *Attorney, Agent, or Firm* — KED & Associates LLP

(57) ABSTRACT

The present disclosure relates to a gas engine power generation system, having an engine configured to generate mechanical energy by burning an air-fuel mixture supplied from a mixer, which mixes air filtered by passing through an air cleaner, and fuel of a predetermined pressure which has passed through a zero governor, in which the gas engine power generation system converts the mechanical energy of the engine into electrical energy. The gas engine power generation system according to an embodiment of the present disclosure includes: an intake path having a first intake passage and a second intake passage in which air to be supplied to the mixer flows; an intake passage controller configured to open either one of the first intake passage or the second intake passage and to close the other one; a coolant pump configured to supply coolant to the engine; a radiator configured to dissipate heat of the coolant having passed through the engine; an intake air heater provided in the intake path at a portion where the second intake passage is formed, and configured to dissipate heat of the coolant having passed through the engine; a coolant passage controller configured to distribute the coolant, having passed through the engine, to the coolant pump, the radiator, and the intake air heater; and a controller configured to control operations of the intake passage controller, the coolant passage controller, and the coolant pump based on temperature of the coolant, having passed through the engine, and load information of the engine.

14 Claims, 6 Drawing Sheets

(56) References Cited

U.S. PATENT DOCUMENTS

2014/0150755 A1* 6/2014 Cunningham ......... F02M 31/10
                                                    123/563
2021/0108580 A1* 4/2021 Kolhouse ............... F02M 26/06

FOREIGN PATENT DOCUMENTS

| JP | 3630040 | 12/2004 |
| KR | 10-1998-0057291 | 9/1998 |
| WO | WO 2018/183059 | 10/2018 |

* cited by examiner

FIG. 6

| | STARTING | IDLING | ACCELERATING | RUNNING AT CONSTANT SPEED | FULL LOAD | DECELERATING | IDLING |
|---|---|---|---|---|---|---|---|
| ENGINE SPEED | | | | | | | |
| COOLANT TEMPERATURE AND LOAD STATE | LOW COOLANT TEMPERATURE | HEATING COOLANT | COMPLETING WARM-UP | PART LOAD | MAXIMUM LOAD | PART LOAD | PART LOAD |
| INTAKE AIR HEATING STRATEGY | CASE 1 | CASE 1 | CASE 2 | CASE 3 | CASE 2 | CASE 3 | CASE 3 |

GAS ENGINE POWER GENERATION SYSTEM

CROSS-REFERENCE TO RELATED APPLICATION

This application claims the priority from Korean Patent Application No. 10-2019-0120064, filed on Sep. 27, 2019, in the Korean Intellectual Property Office, the disclosure of which is incorporated herein by reference in its entirety.

BACKGROUND OF THE INVENTION

1. Field of the Invention

The present disclosure relates to a gas engine power generation system, and more particularly to a gas engine power generation system, in which intake air, supplied to an engine, is heated using heat generated in the engine, thereby reducing pumping loss when the engine operates under part load conditions, and improving combustion efficiency.

2. Description of the Related Art

Generally, a power generation system is a device for converting mechanical energy, received from a power source, into electrical energy. Here, examples of the power source may include a turbine, a water turbine, a motor, a gas engine, and the like.

In the case where a power source of a generator is a gas engine, thermal energy produced by combustion of air and fuel in an engine cylinder is converted into mechanical energy of a linear reciprocating motion of the piston. Further, the reciprocating motion of the piston as the mechanical energy is converted into a rotary motion by a crankshaft connected to a connecting rod. The generator may receive the mechanical energy of the engine through the crankshaft as an output shaft of the engine, and may convert the mechanical energy into electrical energy.

For example, the generator may generate power as the crankshaft of the engine rotates a rotor of the generator to induce a current to flow in a coil wound around a stator of the generator. Further, a power generation system having the engine and the generator may be referred to as a gas engine power generation system, and FIG. 1 is a schematic diagram illustrating the gas engine power generation system.

Referring to FIG. 1, in the gas engine power generation system, fuel and air passes through a zero governor 1 and an air cleaner 2, respectively, to be mixed in a mixer 3 and discharged as a mixture. Then, the fuel-air mixture passes through a supercharger 4, or a turbocharger (not shown), and a throttle valve 5 to be fed into a cylinder (not numbered) of an engine 6 through an intake manifold 6a.

Thermal energy, produced by combustion of the fuel-air mixture in the engine 6, may be converted into mechanical energy to drive a generator GE, and as a result, the generator GE may generate electrical energy. Further, exhaust gas, generated by the combustion of the fuel-air mixture in the engine 6, passes through an exhaust manifold 6b to be discharged to the outside through an exhaust gas heat exchanger 8a and a muffler 7a, and condensate water, generated while the exhaust gas is discharged, is purified by a drain filter 7b to be discharged to the outside.

In order to prevent overheating of the engine 6, as well as damage and performance degradation resulting from the overheating, coolant circulated by a coolant pump 8 may be supplied to the engine 6 through the exhaust gas heat exchanger 8a. The coolant, which is heated while passing through the engine 6, may be guided into a radiator 9 or the coolant pump 8 via a 3-way valve 8b.

JP 3630040 B2 discloses technology for supplying a portion of high-temperature combustion gas, generated in an engine, to intake air in order to improve the starting performance of the engine. However, the technology has problems in that the starting performance may be rather degraded as oxygen concentration in the intake air is reduced; and in order to heat the intake air, it is required to consume fuel separately from the fuel consumed for generating power in the engine, thereby reducing engine efficiency.

KR 10-1998-0057291 discloses technology for heating intake air, supplied to an engine, using an air heater provided in an intake air line in order to improve the starting performance of the engine. However, the technology also has a problem in that it is required to consume power separately in order to operate the air heater.

Further, the above technologies have a drawback in that the technologies merely focus on improving the starting performance of the engine, without providing any method to reduce pumping loss when the engine operates under part load conditions, and to improve engine efficiency.

SUMMARY OF THE INVENTION

It is a first object of the present disclosure to provide a gas engine power generation system, in which intake air, supplied to an engine, is heated using heat generated in the engine, thereby reducing pumping loss when the engine operates under part load conditions, and improving combustion efficiency.

It is a second object of the present disclosure to provide a gas engine power generation system, in which by establishing an intake air heating strategy according to the coolant temperature and engine load, intake air may be heated at a proper time in terms of effective engine operation.

The objects of the present disclosure are not limited to the aforementioned objects and other objects not described herein will be clearly understood by those skilled in the art from the following description.

The present disclosure relates to a gas engine power generation system having an engine configured to generate mechanical energy by burning an air-fuel mixture supplied from a mixer, which mixes air filtered by passing through an air cleaner, and fuel of a predetermined pressure which has passed through a zero governor, in which the gas engine power generation system converts the mechanical energy of the engine into electrical energy.

In accordance with an aspect of the present disclosure, the above and other objects can be accomplished by providing the gas engine power generation system, including: an intake path having a first intake passage and a second intake passage in which air to be supplied to the mixer flows; an intake passage controller configured to open either one of the first intake passage or the second intake passage and to close the other one; a coolant pump configured to supply coolant to the engine; a radiator configured to dissipate heat of the coolant having passed through the engine; an intake air heater provided in the intake path at a portion where the second intake passage is formed, and configured to dissipate heat of the coolant having passed through the engine; a coolant passage controller configured to distribute the coolant, having passed through the engine, to the coolant pump, the radiator, and the intake air heater; and a controller configured to control operations of the intake passage controller, the coolant passage controller, and the coolant pump based on temperature of the coolant, having passed through the engine, and load information of the engine.

The gas engine power generation system may further include: a temperature sensor configured to sense the temperature of the coolant, having passed through the engine, and to transmit the sensed temperature to the controller; a circulation channel forming a closed loop by sequentially passing through the coolant pump, the engine, and the coolant passage controller; and a heat dissipation channel having a first heat dissipation channel, forming a closed loop by sequentially passing through the coolant pump, the engine, the coolant passage controller, and the radiator, and a second heat dissipation channel forming a closed loop by sequentially passing through the coolant pump, the engine, the coolant passage controller, and the intake air heater, wherein the coolant passage controller may open and close each of the circulation channel and the heat dissipation channel.

When the engine starts, the controller may control the intake passage controller to open the first intake passage and to close the second intake passage; may control the coolant passage controller to open the circulation channel and to close the heat dissipation channel; and may control the coolant pump to circulate the coolant through the circulation channel.

The gas engine power generation system may further include a pressure sensor disposed at an intake manifold of the engine, and configured to sense pressure of the air-fuel mixture flowing through the intake manifold and to transmit the sensed pressure to the controller, wherein in response to the pressure of the mixture flowing through the intake manifold being lower than or equal to a reference pressure, the controller may determine that the load of the engine is a part load, and in response to the pressure of the mixture exceeding the reference pressure, the controller may determine that the load of the engine is a maximum load.

In a case where the temperature of the coolant, having passed through the engine, is greater than or equal to a reference temperature, in response to the load of the engine being the part load, and no knocking of the engine being detected, the controller may control the intake passage controller to close the first intake passage and to open the second intake passage; may control the coolant passage controller to open the circulation channel and the heat dissipation channel; and may control the coolant pump to circulate the coolant through the circulation channel and the heat dissipation channel.

Other unmentioned technical solutions can be clearly understood from the following description by those having ordinary skill in the technical field to which the present disclosure pertains.

BRIEF DESCRIPTION OF THE DRAWINGS

The above and other objects, features and advantages of the present disclosure will be more apparent from the following detailed description in conjunction with the accompanying drawings, in which:

FIG. 6 is a diagram explaining an intake air heating strategy based on coolant temperature and an engine load of a gas engine power generation system, according to an embodiment of the present disclosure.

DETAILED DESCRIPTION OF THE PREFERRED EMBODIMENTS

Figure 1:
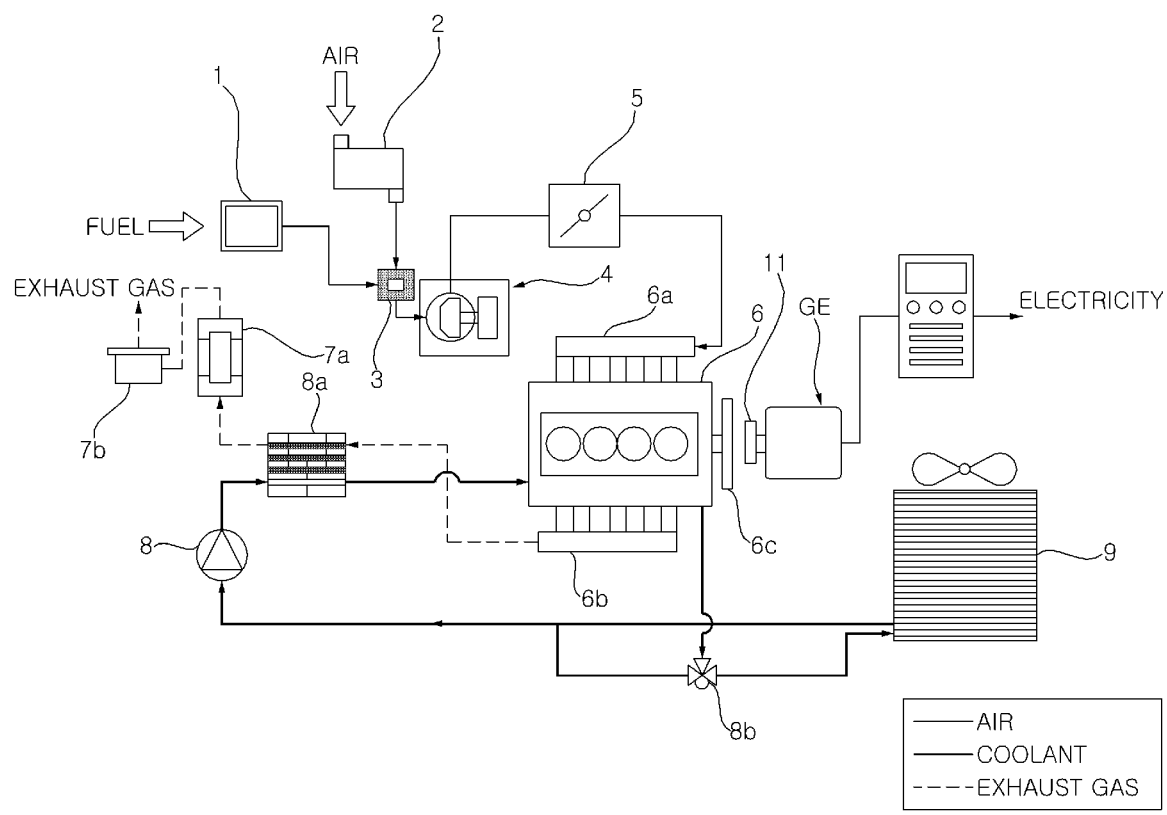
FIG. 1 is a schematic block diagram illustrating an example of a gas engine power generation system according to a general technique.

Advantages and features of the present disclosure and methods for accomplishing the same will be more clearly understood from exemplary embodiments described below with reference to the accompanying drawings. However, the present disclosure is not limited to the following embodiments but may be implemented in various forms. The embodiments are provided only to complete disclosure of the present disclosure and to fully provide a person having ordinary skill in the art to which the present disclosure pertains with the category of the present disclosure, and the present disclosure will be defined by the scope of the appended claims. Wherever possible, like reference numerals generally denote like elements through the specification.

The present disclosure relates to a gas engine generation system for converting mechanical energy from an engine into electrical energy. More specifically, air, passing through an air cleaner, and fuel, passing through a zero governor, are mixed in a mixer to be fed into an intake manifold of the engine through a supercharger (or turbocharger depending on embodiments) and a throttle valve. The engine may produce mechanical energy by combustion of the air-fuel mixture, which is triggered by spark ignition provided by an igniter, and the mechanical energy of the engine may be converted into electrical energy by a generator.

Here, the air cleaner is a device for supplying clean air to the mixer by removing foreign matter, such as dust and the like contained in the air, using a filter provided therein. Further, the zero governor is a device for controlling fuel to be supplied to the mixer at a constant pressure regardless of a change in pressure or flow rate of the supplied fuel.

In such gas engine power generation system, the engine generally operates under part load, which is lower than maximum load, during most of the operating time. That is, it is preferable to cool the air supplied to the engine in order to improve a maximum torque of the engine, but while the engine operates under part load conditions, it is preferable to heat the air in order to reduce pumping loss of the engine and to increase combustion efficiency. To this end, components of the present disclosure are provided, which will be described below.

Hereinafter, referring to FIGS. 2 to 5, the gas engine power generation system will be described below in further detail.

Figure 2:
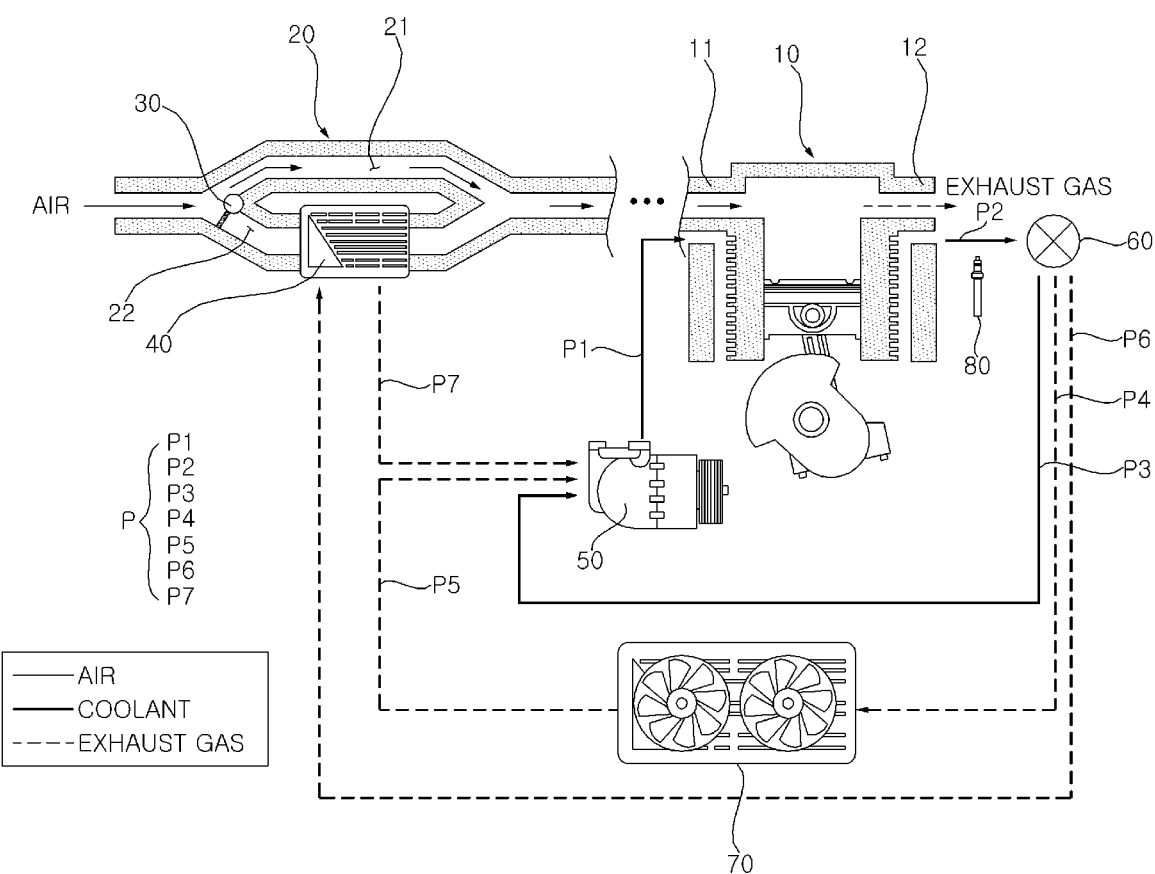
FIGS. 2 to 4 are diagrams illustrating an intake passage and a coolant passage of a gas engine power generation system according to embodiments of the present disclosure.
Figure 3:
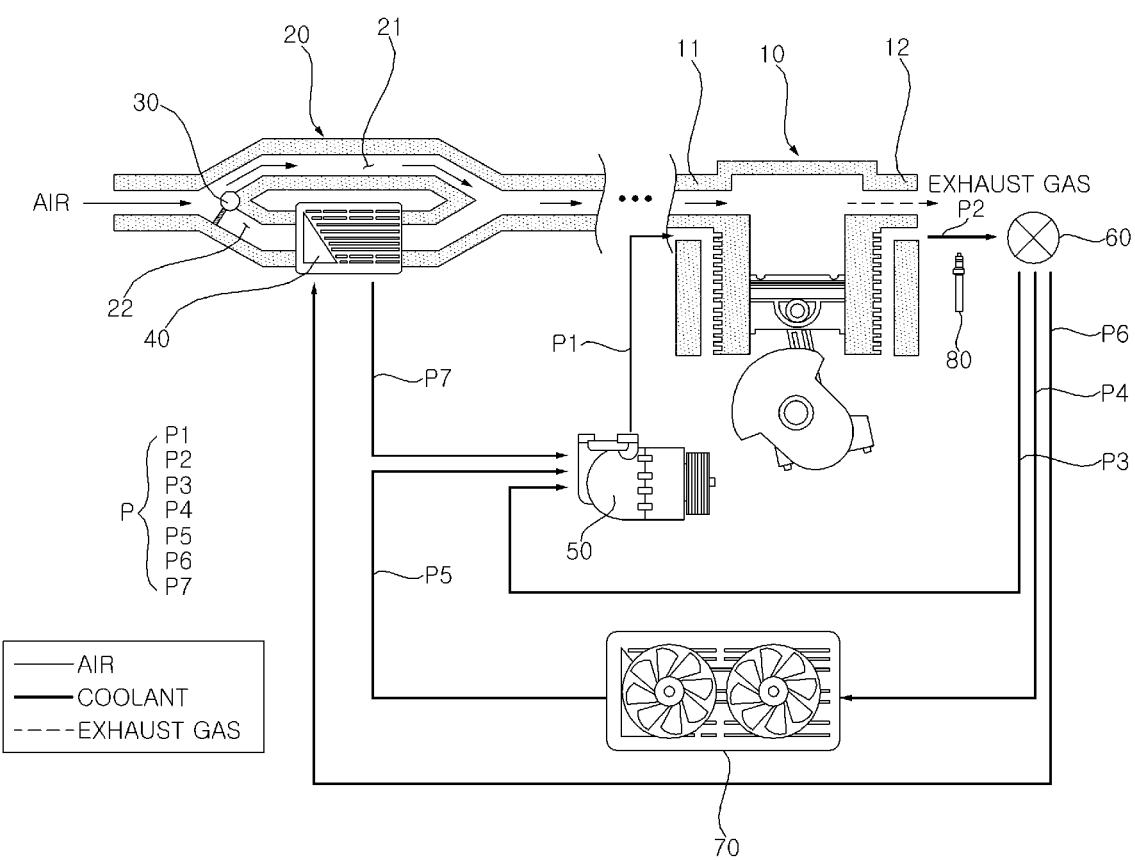
Figure 4:
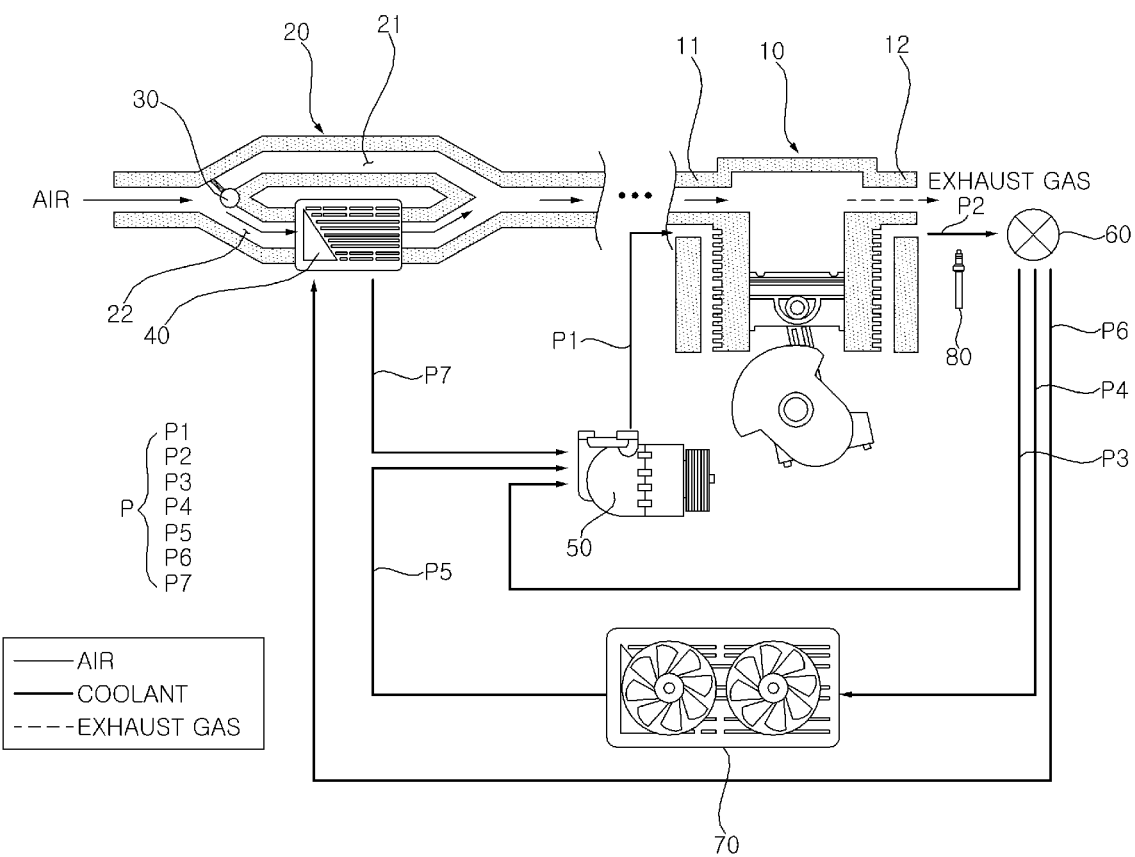
Figure 5:
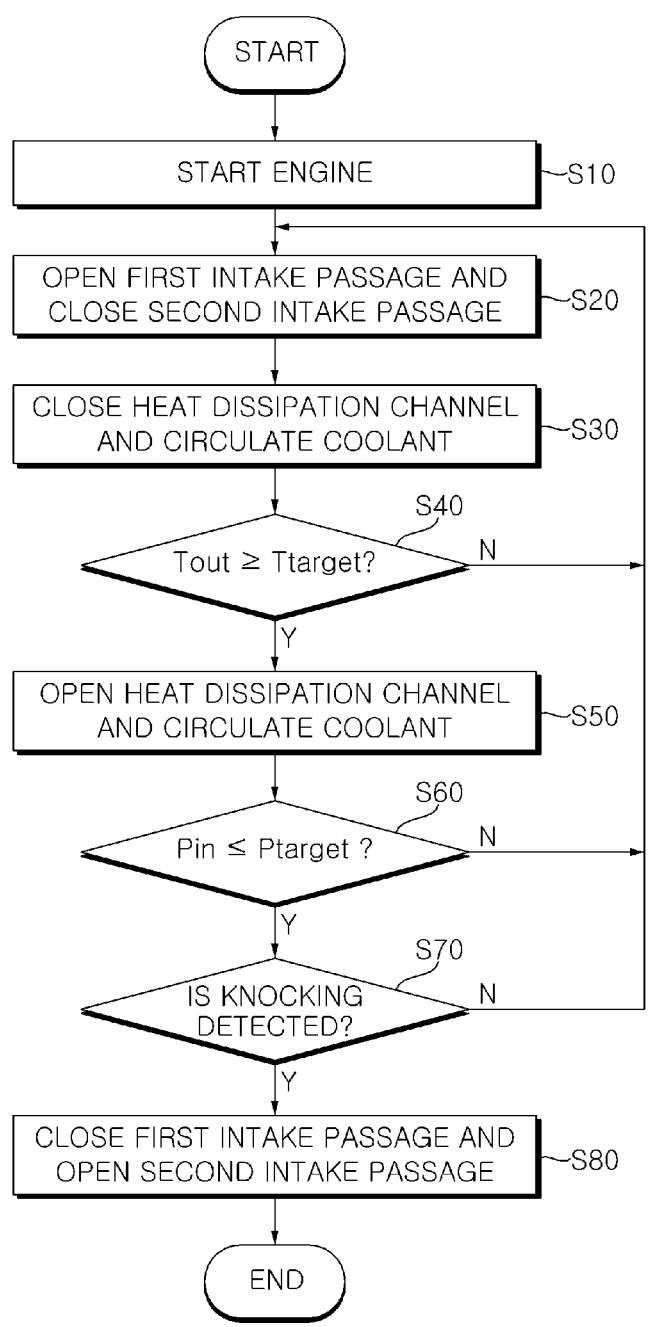
FIG. 5 is a flowchart illustrating a method of controlling intake air heating of a gas engine power generation system according to an embodiment of the present disclosure.

FIGS. 2 to 4 are diagrams illustrating an intake passage and a coolant passage of a gas engine power generation system according to embodiments of the present disclosure. FIG. 5 is a flowchart illustrating a method of controlling intake air heating of a gas engine power generation system according to an embodiment of the present disclosure.

Referring to FIG. 2, the gas engine power generation system includes an engine 10, an intake path 20, an intake passage controller 30, a coolant pump 50, a radiator 70, an intake air heater 40, a coolant passage controller 60, and a controller 90. Air, passing through the intake path 20, is mixed with fuel, passing through the zero governor, in the mixer to be fed into an intake manifold 11 of the engine 10 through the supercharger and the throttle valve. For convenience of explanation of the present disclosure, the supercharger and the throttle valve are omitted from the drawing.

Further, exhaust gas, generated from the combustion of the mixture in the engine 10, is discharged to the outside through an exhaust manifold 12 of the engine 10.

A first intake passage 21 and a second intake passage 22, through which air to be supplied to the mixer flows, are formed in the intake path 20. For example, the intake path 20 may be disposed between the air filter and the mixer. In this case, the intake path 20 may include a single inflow channel (not numbered), which is connected to the air filter and through which air, passing through the air filter, flows; and a single discharge channel (not numbered), which is connected to the mixer and through which air, passing through the first intake passage 21 and the second intake passage 22 flows. That is, the first intake passage 21 and the second intake passage 22 may be disposed between the single inflow channel and the single discharge channel.

The intake passage controller 30 may open either one of the first intake passage 21 or the second intake passage 22 but close the other one. That is, in the case where the intake passage controller 30 opens the first intake passage 21 but closes the second intake passage 22, the air passing through the single inflow channel may pass through the first intake passage 21 to be guided into the mixer through the single discharge channel. By contrast, in the case where the intake passage controller 30 opens the second intake passage 22 but closes the first intake passage 21, the air passing through the single inflow channel may pass through the second intake passage 22 to be guided into the mixer through the single discharge channel.

The intake passage controller 30 may include various components for opening and closing the intake passages, and examples thereof may include a valve or a damper. The intake passage controller 30 may be electrically connected to the controller 90 which will be described below, to control opening and closing of each of the first intake passage 21 and the second intake passage 22 according to a control signal of the controller 90.

The coolant pump 50 may supply coolant to the engine 10. More specifically, the coolant, passing through a water jacket (not numbered) of the engine 10 by the coolant pump 50, may remove heat generated by the engine 10. The coolant may circulate in such a manner that after being discharged from the coolant pump 50, the coolant flows through a coolant passage, which will be described below, via the engine 10 and the like, to be fed into the coolant pump 50 again, which will be described later in further detail.

The radiator 70 may dissipate heat of the coolant having passed through the engine 10. For example, the coolant, having passed through the engine 10, is introduced into the radiator 70 to be cooled by heat exchanging with air circulated by a fan (not numbered) provided in the radiator 70. The coolant, which is cooled while passing through the radiator 70, may be fed into the coolant pump 50 again. Depending on embodiments, the radiator 70 may include not only a device for heat exchanging with outdoor air but also a device for heat exchanging with indoor air.

The intake air heater 40 may be provided at a portion where the second intake passage 22 is formed in the intake path 20. The intake air heater 40 may dissipate heat of the coolant having passed through the engine 10. That is, when the air flows in the second intake passage 22, the coolant, having passed through the engine 10 and introduced into the intake air heater 40, may be cooled by heat exchanging with the air flowing in the second intake passage 22, thereby heating the air flowing in the second intake passage 22.

The coolant passage controller 60 may distribute the coolant, having passed through the engine 10, into the coolant pump 50, the radiator 70, and the intake air heater 40. The coolant passage controller 60 may include various components for opening and closing the coolant passage, and examples thereof include a valve or a damper. The coolant passage controller 60 may be electrically connected to the controller 90 which will be described below, to control opening and closing of the coolant passage according to a control signal of the controller 90.

The controller 90 may control the operations of the intake passage controller 30, the coolant passage controller 60, and the coolant pump 50 based on temperature Tout of the coolant having passed through the engine 10, and load information of the engine 10. To this end, the gas engine power generation system may further include a temperature sensor 80 and a pressure sensor (Manifold Absolute Pressure (MAP) sensor).

Here, the temperature sensor 80, disposed at a coolant discharge side of the engine 10, may sense the temperature Tout of the coolant having passed through the engine 10 and may transmit the sensed temperature data to the controller 90. Further, the pressure sensor (MAP sensor), disposed at a side of the intake manifold 11 of the engine 10, may sense pressure of the air-fuel mixture flowing through the intake manifold 11 and may transmit the sensed pressure data to the controller 90.

In this case, as the load of the engine 10 increases, a degree of opening of a throttle valve increases, thereby increasing pressure of the mixture supplied to the engine 10. Accordingly, it can be understood that the pressure sensed by the pressure sensor (MAP sensor) is proportional to the load of the engine 10. That is, if the pressure, sensed by the pressure sensor (MAP sensor), of the mixture flowing through the intake manifold 11 exceeds a reference pressure Ptarget (e.g., 750 mbar), the controller 90 may determine that the load of the engine 10 reaches, or is close to, a maximum load; and if the pressure is lower than the reference pressure Ptarget, the controller 90 may determine that the load of the engine 10 is a part load which is lower than the maximum load. Here, the reference pressure Ptarget may be set differently depending on the specifications of the engine 10.

In addition, the coolant passage, through which the coolant circulated by the coolant pump 50 flows, may include a circulation channel and a heat dissipation channel.

The circulation channel may form a closed loop by sequentially passing through the coolant pump 50, the engine 10, and the coolant passage controller 60. More specifically, the circulation channel may be composed of a first pipe P1, connecting the coolant pump 50 and the engine 10, a second pipe P2 connecting the engine 10 and the coolant passage controller 60, and a third pipe P3 connecting the coolant passage controller 60 and the coolant pump 50.

The heat dissipation channel may include a first heat dissipation channel and a second heat dissipation channel. The first heat dissipation channel may form a closed loop by sequentially passing through the coolant pump 50, the engine 10, the coolant passage controller 60, and the radiator 70. More specifically, the first heat dissipation channel may be composed of a first pipe P1, a second pipe P2, a fourth pipe P4 connecting the coolant passage controller 60 and the radiator 70, and a fifth pipe P5 connecting the radiator 70 and the coolant pump 50. The second heat dissipation channel may form a closed loop by sequentially passing through the coolant pump 50, the engine 10, the coolant passage controller 60 and the intake air heater 40. More specifically, the second heat dissipation channel may be composed of a first pipe P1, a second pipe P2, a sixth pipe P6 connecting the coolant passage controller 60 and the intake air heater 40, and a seventh pipe P7 connecting the intake air heater 40 and the coolant pump 50.

In this case, the coolant passage controller 60 may control the opening and closing of each of the circulation channel and the heat dissipation channel. That is, if the coolant passage controller 60 opens the circulation channel while closing the heat dissipation channel, the coolant discharged from the coolant pump 50 is heated while passing through the engine 10, and then is introduced into the coolant pump 50 again. Accordingly, when the operation of the engine 10 continues, the temperature of the coolant may also continue to increase. However, if the coolant passage controller 60 opens not only the circulation channel but also the heat dissipation channel, the coolant discharged from the coolant pump 50 is heated while passing through the engine 10, and then is cooled while passing through each of the radiator 70 and the intake air heater 40, to be introduced into the coolant pump 50 again. Accordingly, by controlling a flow rate of the coolant guided into the radiator 70 and the intake air heater 40, the temperature of the coolant may be maintained in a predetermined range.

Referring to FIGS. 2 and 5, once the engine 10 starts in S10, the controller 90 may control the operations of the intake passage controller 30, the coolant passage controller 60, and the coolant pump 50 as follows.

That is, the controller 90 may control the intake passage controller 30 to open the first intake passage 21 and to close the second intake passage 22 in S20. At the same time or different times, the controller 90 may control the coolant passage controller 60 to open the circulation channel and to close the heat dissipation channel, and may control the coolant pump 50 to circulate the coolant through the circulation channel in S30.

In this manner, by controlling the coolant to circulate through the circulation channel when the engine 10 starts and the temperature of the coolant is not increased sufficiently, it is possible to prepare (i.e., warm up) the coolant so that temperature of the coolant may be increased to a level sufficient to heat the intake air. In this case, the air, having passed through the single inflow channel, passes through the first intake passage 21 while not being heated, to be guided into the mixer through the single discharge channel.

Referring to FIGS. 3 and 5, if the temperature Tout (i.e., temperature sensed by the temperature sensor 80) of the coolant, having passed through the engine 10, is greater than or equal to a reference temperature Ttarget (e.g., 70° C.) (YES in S40), the controller 90 may control the coolant passage controller 60 to open the circulation channel and the heat dissipation channel, and may control the coolant pump 50 to circulate the coolant through the circulation channel and the heat dissipation channel in S50.

In this manner, by controlling the coolant to circulate through the circulation channel and the heat dissipation channel when the temperature of the coolant is increased sufficiently, it is possible to prevent an excessive increase in the temperature of the coolant, as well as to prepare the coolant for use in heating the intake air when predetermined conditions are satisfied which will be described later. In this case, the air, having passed through the single inflow channel, passes through the first intake passage 21 while not being heated, to be guided into the mixer through the single discharge channel.

If the temperature Tout of the coolant, having passed through the engine 10, is greater than or equal to a threshold temperature (e.g., 85° C.) which is higher than the reference temperature Ttarget, the controller 90 may control the coolant pump 50 to increase a flow rate of the coolant circulating through the heat dissipation channel, thereby preventing degradation of heat dissipation performance of the engine and damage to the pipe, which are caused by an excessive increase in the temperature of the coolant.

Referring to FIGS. 4 and 5, in the case where the temperature Tout of the coolant, having passed through the engine 10, is greater than or equal to the reference temperature Ttarget, if the load of the engine 10 is the part load (i.e., YES in S60), and if no knocking of the engine 10 is detected (i.e., YES in S70), the controller 90 may control the operations of the intake passage controller 30, the coolant passage controller 60, and the coolant pump 50 as follows. Here, the case where the load of the engine 10 is the part load corresponds to the case where the pressure Pin, sensed by the pressure sensor (MAP sensor), is less than or equal to the reference pressure Ptarget (e.g., 750 mbar), as described above. Further, knocking is a phenomenon in which a hammering sound is produced when combustion of an air-fuel mixture in an engine cylinder does not take place normally in a course of flame propagation after flame formation triggered by the spark ignition, but the mixture burns before the spark-ignition (pre-ignition) or combustion occurs at a position where the flame is not propagated yet (end-zone), or the like.

That is, the controller 90 may control the intake passage controller 30 to close the first intake passage 21 and to open the second intake passage 22 in S80. Further, the controller 90 may control the coolant passage controller 60 to open the circulation channel and the heat dissipation channel, and may control the coolant pump 50 to circulate the coolant through the circulation channel and the heat dissipation channel.

In this case, the air, having passed through the single inflow channel, passes through the second intake passage 22 while being heated by the coolant flowing through the intake air heater 40, to be guided into the mixer through the single discharge channel. In this manner, a volume of the mixture increases, such that pumping loss of the engine 10 may be reduced. Here, the pumping loss is the energy used by the engine to aspirate the air/fuel mixture into the cylinder and expel its exhaust fumes out, after the energy is generated by explosive combustion of the air/fuel mixture in a cylinder of the engine 10.

Further, as the intake is heated, the evaporation of the fuel is promoted, thereby reducing exhaust gas emissions, and the temperature in the cylinder of the engine 10 increases, thereby improving combustion stability and combustion efficiency.

Referring to FIGS. 3 and 5, in the case where the temperature Tout of the coolant, having passed through the engine 10, is greater than or equal to the reference temperature Ttarget, if the load of the engine 10 is the maximum load (i.e., NO in S60), the controller 90 may control the operations of the intake passage controller 30, the coolant passage controller 60, and the coolant pump 50 as follows. Here, the case where the load of the engine 10 is the maximum load corresponds to the case where the pressure Pin, sensed by the pressure sensor (MAP sensor), exceeds the reference pressure Ptarget (e.g., 750 mbar), as described above.

That is, the controller 90 may control the intake passage controller 30 to open the first intake passage 21 and to close the second intake passage 22. Further, the controller 90 may control the coolant passage controller 60 to open the circulation channel and the heat dissipation channel, and may control the coolant pump 50 to circulate the coolant through the circulation channel and the heat dissipation channel.

In this case, the air, having passed through the single inflow channel, passes through the first intake passage 21, while not being heated, to be guided into the mixer through the single discharge channel. In this manner, the air supplied to the engine 10 is not heated, thereby achieving maximum volumetric efficiency, and effectively generating a maximum load or a maximum torque.

Referring to FIGS. 3 and 5, in the case where the temperature Tout of the coolant, having passed through the engine 10, is greater than or equal to the reference temperature Ttarget, if knocking of the engine 10 is detected (i.e., NO in S70), the controller 90 may control the intake passage controller 30, the coolant passage controller 60, and the coolant pump 50 as follows.

That is, the controller 90 may control the intake passage controller 30 to open the first intake passage 21 and to close the second intake passage 22. Further, the controller 90 may control the coolant passage controller 60 to open the circulation channel and the heat dissipation channel, and may control the coolant pump 50 to circulate the coolant through the circulation channel and the heat dissipation channel.

In this case, the air, having passed through the single inflow channel, passes through the first intake passage 21, while not being heated, to be guided into the mixer through the single discharge channel. In this manner, the air supplied to the engine 10 is not heated, such that the knocking phenomenon caused by abnormal combustion in the engine 10 may be prevented.

FIG. 6 is a diagram explaining an intake air heating strategy based on coolant temperature and an engine load of a gas engine power generation system, according to an embodiment of the present disclosure.

Referring to FIG. 6, upon starting the engine 10, it is required to leave the engine idling for a predetermined period of time in order to prepare (i.e., warm up) the coolant, so that the temperature of the coolant may be increased to a level sufficient to heat the intake air. As described above with reference to FIGS. 2 and 5, the coolant flows only through the circulation channel, and the air may not be heated while passing through the first intake passage 21 (CASE 1).

That is, after idling for a predetermined period of time, when the engine 10 is accelerated for power generation, such that the temperature of the coolant is increased sufficiently (i.e., warm-up is complete), it is required to prevent an excessive increase in the temperature of the coolant and to complete the preparation for heating the intake. In this case, as described above with reference to FIGS. 3 and 5, the coolant flows through the circulation channel and the heat dissipation channel, and the air may not be heated while passing through the first intake passage 21 (CASE 2).

After the warm-up is complete, if the load of the engine 10 is a part load (i.e., engine running at a constant speed, decelerating, running at idle, etc. after the warm-up is complete), it is required to reduce pumping loss by heating the air supplied to the engine 10, and to increase combustion efficiency. In this case, as described above with reference to FIGS. 4 and 5, the coolant flows through the circulation channel and the heat dissipation channel, and the air may be heated while passing through the second intake passage 22 (CASE 3).

However, when the load of the engine 10 is the maximum load, or the knocking phenomenon of the engine 10 is detected, it is required not to heat the air supplied to the engine 10. In this case, as described above with reference to FIGS. 3 and 5, the coolant flows through the circulation channel and the heat dissipation channel, and the air may not be heated while passing through the first intake passage 21 (CASE 2).

The gas engine power generation system according to the present disclosure has one or more of the following effects.

First, the intake air heater for dissipating heat of the coolant, having passed through the engine, is disposed in the intake path, to heat intake air supplied to the engine, thereby reducing pumping loss and improving combustion efficiency.

Secondly, by controlling the intake passage and the coolant passage based on the temperature of the coolant, having passed through the engine, and load information of the engine, the intake air supplied to the engine may be heated at a proper time in terms of effective engine operation.

While the gas engine power generation system according to the embodiments of the present disclosure has been described above with reference to the accompanying drawings, it should be understood that the present disclosure is not limited to the aforementioned embodiments, and various modifications and equivalent embodiments may be possible without departing from the scope and spirit of the invention as defined by the appended claims. Therefore, the scope of the present disclosure should be limited only by the accompanying claims and equivalents thereof.

What is claimed is:

1. A gas engine power generation system having an engine configured to burn an air-fuel mixture supplied from a mixer, which mixes air and fuel, the gas engine power generation system comprising:
    an intake path having a first intake passage and a second intake passage in which air to be supplied to the mixer flows;
    an intake passage controller configured to open either one of the first intake passage or the second intake passage and to close the other one;
    a coolant pump configured to supply coolant to the engine;
    a radiator configured to dissipate heat of the coolant having passed through the engine;
    an intake air heater provided in the intake path at a portion where the second intake passage is formed, and configured to dissipate heat of the coolant having passed through the engine;
    a coolant passage controller configured to distribute the coolant, having passed through the engine, to the coolant pump, the radiator, and the intake air heater; and
    a controller configured to control operations of the intake passage controller, the coolant passage controller, and the coolant pump based on temperature of the coolant, having passed through the engine, and load information of the engine,
    wherein when the engine starts, the controller controls the intake passage controller to open the first intake passage and to close the second intake passage.

2. The gas engine power generation system of claim 1, further comprising:
    a temperature sensor configured to sense the temperature of the coolant, having passed through the engine, and to transmit the sensed temperature to the controller;
    a circulation channel forming a closed loop by sequentially passing through the coolant pump, the engine, and the coolant passage controller; and
    a heat dissipation channel having a first heat dissipation channel, forming a closed loop by sequentially passing through the coolant pump, the engine, the coolant passage controller, and the radiator, and a second heat dissipation channel forming a closed loop by sequentially passing through the coolant pump, the engine, the coolant passage controller, and the intake air heater, wherein the coolant passage controller opens and closes each of the circulation channel and the heat dissipation channel.

3. The gas engine power generation system of claim 2, wherein when the engine starts, the controller:

controls the coolant passage controller to open the circulation channel and to close the heat dissipation channel; and controls the coolant pump to circulate the coolant through the circulation channel.

4. The gas engine power generation system of claim 3, wherein in response to the temperature of the coolant, having passed through the engine, being greater than or equal to a reference temperature, the controller:

controls the coolant passage controller to open the circulation channel and the heat dissipation channel; and controls the coolant pump to circulate the coolant through the circulation channel and the heat dissipation channel.

5. The gas engine power generation system of claim 3, further comprising a pressure sensor disposed at an intake manifold of the engine, and configured to sense pressure of the air-fuel mixture flowing through the intake manifold and to transmit the sensed pressure to the controller, wherein in response to the pressure of the mixture flowing through the intake manifold being lower than or equal to a reference pressure, the controller determines that the load of the engine is a partial load, and in response to the pressure of the mixture exceeding the reference pressure, the controller determines that the load of the engine is a maximum load.

6. The gas engine power generation system of claim 5, wherein in a case where the temperature of the coolant, having passed through the engine, is greater than or equal to the reference temperature, in response to the load of the engine being the partial load, and no knocking of the engine being detected, the controller:

controls the intake passage controller to close the first intake passage and to open the second intake passage;

controls the coolant passage controller to open the circulation channel and the heat dissipation channel; and controls the coolant pump to circulate the coolant through the circulation channel and the heat dissipation channel.

7. The gas engine power generation system of claim 6, wherein in a case where the temperature of the coolant, having passed through the engine, is greater than or equal to the reference temperature, in response to the load of the engine being the maximum load, the controller:

controls the intake passage controller to open the first intake passage and to close the second intake passage;

controls the coolant passage controller to open the circulation channel and the heat dissipation channel; and controls the coolant pump to circulate the coolant through the circulation channel and the heat dissipation channel.

8. The gas engine power generation system of claim 6, wherein in a case where the temperature of the coolant, having passed through the engine, is greater than or equal to the reference temperature, in response to the knocking of the engine being detected, the controller:

controls the intake passage controller to open the first intake passage and to close the second intake passage;

controls the coolant passage controller to open the circulation channel and the heat dissipation channel; and controls the coolant pump to circulate the coolant through the circulation channel and the heat dissipation channel.

9. The gas engine power generation system of claim 4, wherein in response to the temperature of the coolant, having passed through the engine, being greater than or equal to a threshold temperature which is higher than the reference temperature, the controller controls the coolant pump to increase a flow rate of the coolant circulating through the heat dissipation channel.

10. The gas engine power generation system of claim 1, wherein the intake path is disposed between an air cleaner and the mixer, and wherein the air cleaner provides air to the mixer.

11. The gas engine power generation system of claim 1, wherein each of the intake passage controller and the coolant passage controller includes a valve or a damper.

12. The gas engine power generation system of claim 11, wherein the intake passage controller includes the damper, and the damper is rotatable between an inlet of the first intake passage and an inlet of the second intake passage, and closes the inlet of the first intake passage or the inlet of the second intake passage.

13. The gas engine power generation system of claim 1, wherein when the engine starts, the controller controls the coolant passage controller to provide the coolant having passed through the engine to the coolant pump rather than the radiator and the intake air heater.

14. The gas engine power generation system of claim 1, wherein the engine is configured to generate mechanical energy by burning the air-fuel mixture, wherein the gas engine power generation system is configured to convert the mechanical energy of the engine into electrical energy.

* * * * *